United States Patent

[11] 3,594,997

| [72] | Inventor | William W. Tubesing |
| | | 550 Ansley, Decatur, Ga. 30030 |
| [21] | Appl. No. | 838,827 |
| [22] | Filed | July 3, 1969 |
| [45] | Patented | July 27, 1971 |

[54] LAWN EDGER
9 Claims, 6 Drawing Figs.

| [52] | U.S. Cl. | 56/17.1 |
| [51] | Int. Cl. | A01g 3/06 |
| [50] | Field of Search | 56/25.4 |

[56] References Cited
UNITED STATES PATENTS

| 2,771,730 | 11/1956 | True | 56/25.4 |
| 3,183,652 | 5/1965 | Pratt | 56/25.4 |
| 3,304,700 | 2/1967 | Barber | 56/25.4 |

*Primary Examiner*—Antonio F. Guida
*Assistant Examiner*—J. N. Eskovitz
*Attorney*—B. J. Powell ABSTRACT: A lawn edging and trimming apparatus including a drive element rotatable about a first axis, a support rotatably carrying a driven element wherein the support is rotatable about the first axis and positions the driven element along a second axis parallel to the first and selectively rotates the second axis about a third axis intersecting the first and second axes through the drive and driven elements, drive means for rotating the drive element, flexible drive means drivingly connecting the drive element with the driven element, and a cutting blade carried by the driven element for rotation therewith as well as means for displacing the cutting blade laterally of the support to allow the cutting blade to extend over and behind an elevated object lying between the support means and the cutting blade.

PATENTED JUL 27 1971

INVENTOR
WILLIAM W. TUBESING

BY: *Newton, Hopkins, & Ormsby*
ATTORNEYS

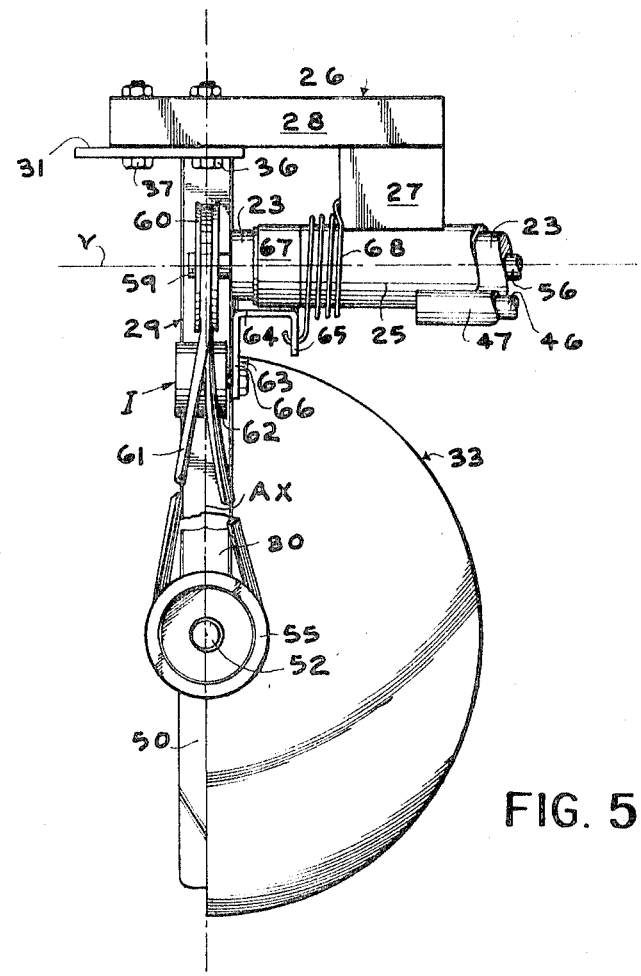

LAWN EDGER

BACKGROUND OF THE INVENTION

Lawn edgers and trimmers are available on the market today which permit adjustment of the cutting blade from a vertical edging plane to a horizontal trimming plane. These devices usually, however, do not permit substantial adjustment of the cutting blade vertically while in the vertical edging plane or the horizontal trimming plane without disengaging the drive to the cutting blade displaced laterally of the support frame so that the blade can be extended over a curb or the like to trim a lawn edge therebehind.

SUMMARY OF THE INVENTION

These and other problems and disadvantages associated with the prior art are overcome by the invention disclosed herein in that the cutting blade can be moved vertically while in the vertical edging position or in the horizontal trimming position, while maintaining connection of the drive with the cutting blade. Moreover, the cutting blade is displaced laterally from the frame sufficiently for the cutting blade to be extended over a curb or the like to trim a lawn edge therebehind.

It is therefore a principal object of this invention to provide a motorized lawn edger and trimmer that can be adjusted for cutting in both a vertical and horizontal plane with a simple pulley and belt drive means which is constructed to insure proper alignment of the drive means in all of its adjusted positions.

A further object of this invention is to provide a motorized lawn edger and trimmer wherein the cutting blade is vertically adjustable relative to the supporting or cutting surface without disconnecting the drive to the cutting blade.

A further object of this invention is to provide a lawn edger wherein the cutting blade is adjustable both above and below the frame while the edger is in operation.

A further object of this invention is to provide a lawn edger that will trim the edge of a lawn adjacent an elevated curb while the edger is supported on the sidewalk or street below the curb.

A still further object of this invention is to provide a motorized heavy-duty lawn edger and trimmer that is economical in manufacture and durable in use.

The apparatus of the invention comprises generally a support frame mounted on rotatable wheels, a drive motor carried on the support frame and having a drive shaft extending laterally from the support frame, a drive pulley mounted on the drive shaft outwardly of the frame, a positioning assembly mounted about the drive shaft and rotatable about a first axis coinciding with the axis of the drive shaft, a driven shaft rotatably mounted in the positioning assembly about an axis parallel to the first axis, a driven pulley mounted on one end of the driven shaft in alignment with the driven pulley, and a cutting blade mounted on the opposite end of the driven shaft outboard of the support frame. The positioning assembly includes means for pivoting the driven shaft and cutting blade about a third axis extending through the center of the drive pulley and the driven pulley and about the first axis.

These and other objects, features and advantages of the invention will become apparent from consideration of the following detail description and accompanying drawing wherein like characters of reference designate corresponding parts throughout and in which:

BRIEF DESCRIPTION OF THE DRAWINGS

FIG. 4, is a vertical sectional view taken along lines 4–of 4 of FIG. 2;

FIG. 5, is a fragmentary plan view of the edger and trimmer showing the cutting blade in the horizontal trimming cutting position; and, FIG. 6, is a side elevation view of the edger and trimmer drive means as illustrated in FIG. 2 with certain other parts omitted.

These figures and the following detailed description disclose a specific embodiment of the invention, however, the inventive concept is not limited thereto since it may be embodied in other forms.

DETAILED DESCRIPTION OF ILLUSTRATIVE EMBODIMENT

The lawn edging and trimming apparatus herein shown includes a wheeled support structure S, a cutting assembly C, and a positioning assembly P which orients the cutting assembly C with respect to the support structure S. The positioning assembly P is effective to change the vertical position of the cutting assembly C both above and below the support structure S while maintaining a driving connection between a drive means D carried by the structure S at all times as well as maintaining the cutting assembly C spaced laterally from the support structure S so that the cutting assembly C can reach over objects to cut grass therebehind. The positioning assembly P is also effective to change the position of the cutting assembly C to cut in a horizontal trimming plane, a vertical edging plane, and in a plurality of cutting planes therebetween.

Figure 1:
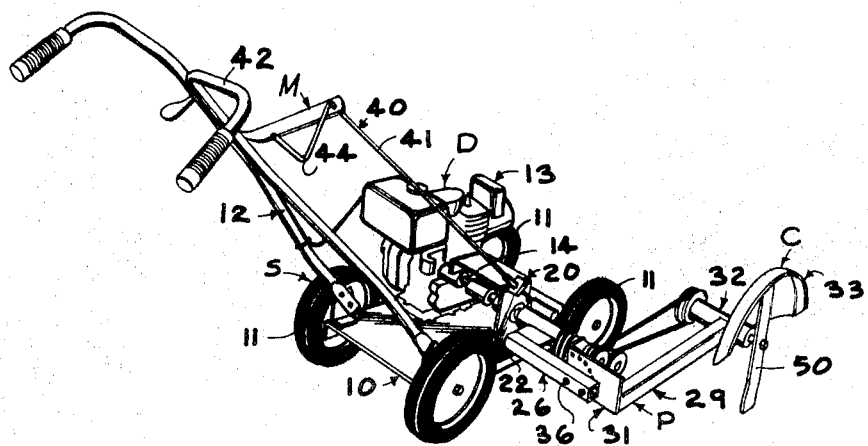
FIG. 1, is a right rear perspective view of the edger and trimmer showing the cutting blade adjusted for cutting in a vertical edging plane.

The wheeled support structure S comprises a base frame 10 supported by a plurality of wheels 11 as seen in FIG. 1. A guide handle 12 of conventional design is pivoted to the frame 10 at the rear edge thereof in conventional manner. The drive means D is carried by the frame 10 and includes a conventional internal combustion engine 13 with a drive shaft 14 extending therefrom transversely of the direction in which the frame 10 is moved. The support structure S further includes an inverted L-shaped support bracket 20 having a horizontally extending base portion 21 connected to the engine 13 over the drive shaft 14 and a vertically extending leg portion 22 connected to the frame 10 outwardly of the drive shaft 14.

Figure 2:
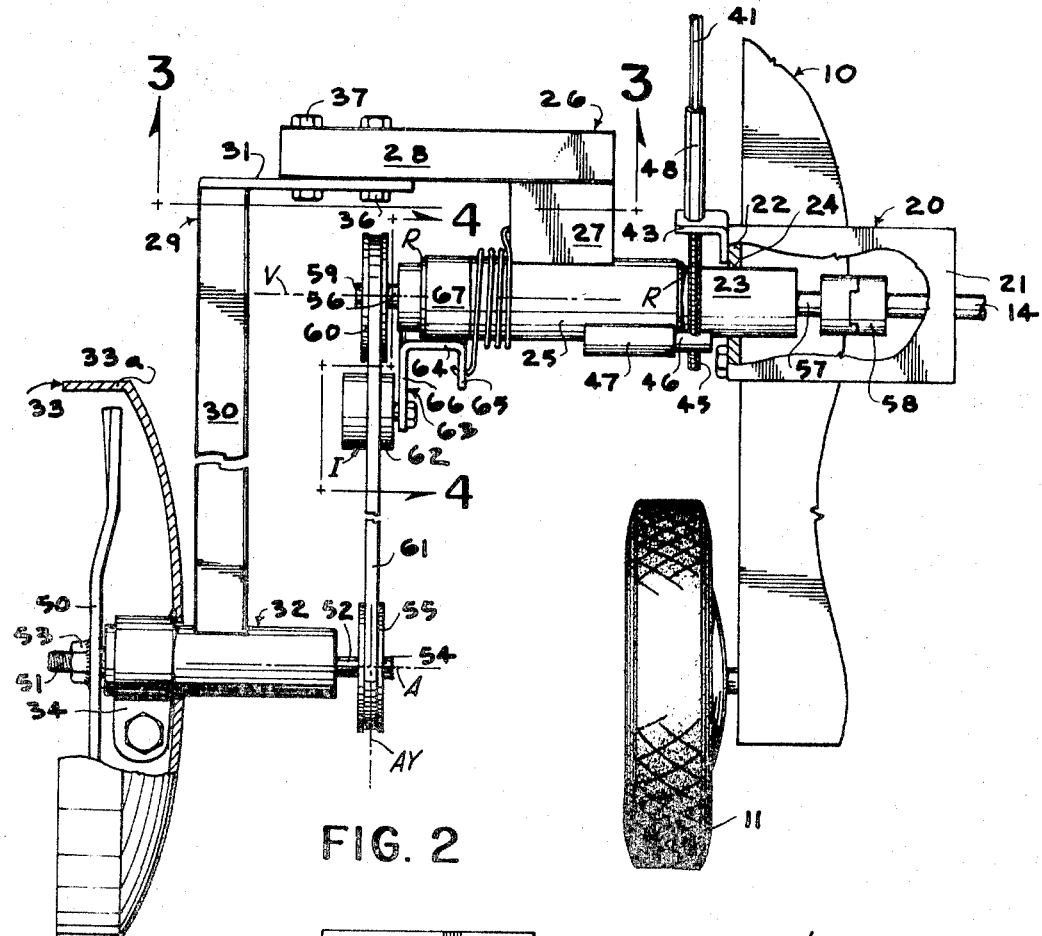
FIG. 2, is an enlarged fragmentary plane view of the edger and trimmer with certain parts omitted and certain parts shown broken away for clarity.
Figure 3:
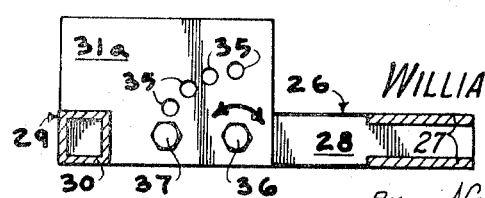
FIG. 3, is a vertical sectional view taken along lines 3–3 of FIG. 2.

The leg portion 22 of bracket 20 defines an opening 24 therethrough centered about the axis of drive shaft 14. A transfer shaft housing 23 is received at one end in opening 24 in alignment with the axis of drive shaft 14 and extends outwardly therefrom as seen in FIGS. 1 and 2.

The drive means D further includes a transfer shaft 56 rotatably journaled in housing 23 by bearings (not shown) in alignment with drive shaft 14. The inner end 57 of transfer shaft 56 is connected to drive shaft 14 through a conventional shaft coupling 58. The outer end 59 of transfer shaft 56 mounts a drive pulley 60 thereon for rotation by drive shaft 14 about a first axis V coinciding with the axis of rotation of shaft 14. Reference to the figures will show that the first axis V is substantially horizontal and perpendicular to the line of motion along which the frame 10 is moved.

The positioning assembly P is rotatably journaled about shaft housing 23 and includes an undercarriage 26 which mounts an L-shaped carriage 29. The undercarriage 26 includes a collar 25 rotatably journaled about housing 23 and held in longitudinal position by a pair of retaining rings R as best seen in FIG. 2. A connector 27 is carried by the collar 25 and extends radially therefrom. A laterally extending pivot base 28 is connected to the extending end of connector 27 and extends outwardly therefrom parallel to the first axis V and spaced from the first axis V and sufficiently to clear drive pulley 60. Therefore, it will be seen that undercarriage 26 is rotatable about the first axis V.

The carriage 29 includes a pivot plate 31 rotatably pinned to pivot base 28 by a bolt 36. A plurality of positioning apertures 35 are arcuately spaced about the bolt 36 and equally distant therefrom. The rotational position of plate 31 about bolt 36 can be selectively fixed by bolt 37 through one of the apertures 35 and an appropriately located aperture in the pivot base 28. The carriage 29 also includes an arm 30 attached to the plate 31 and extending forwardly therefrom substantially parallel to the line of motion of the frame 10. The arm 30 mounts at the forward end thereof a driven shaft support tube 32 oriented along a second axis A parallel to the first axis V and spaced forwardly thereof.

The cutting assembly C includes a driven shaft 52 rotatably journaled in bearings (not shown) in tube 32 about axis A. The inner end 54 of shaft 52 mounts a driven pulley 55 thereon in alignment with pulley 60 and spaced forwardly thereof. The outer end 51 of shaft 52 is threaded and mounts a cutting blade 50 thereon through threaded element 53 so that as the blade 50 is rotated in its cutting direction, the element 53 tends to tighten itself on shaft 52. The blade 50 is generally perpendicular to shaft 52.

The cutting assembly C also includes a semicircular guard 33 having an arcuate outwardly extending flange 33a over a portion of the blade 50. The guard 33 is releasably attached to the support tube 32 through a clamp 34 adjacent the blade 50.

The undercarriage 26 and carriage 29 positions the cutting assembly C so that the pulleys 55 and 60 are always equidistant apart and the pulley 55 is pivoted by carriage 29 about a common line AY extending through the centers of pulleys 55 and 60 and along the centerline of bolt 36.

The drive means D further includes an endless drive belt 61 mounted between the pulleys 55 and 60. Therefore, it will be seen that as the engine 13 rotates the drive pulley 60, the driven pulley 55 will be rotated thus driving the blade 50. An idler mechanism I is provided to maintain driving tension in the belt 61 regardless of the position of the cutting assembly C. The mechanism I includes an idler pulley 62 positioned against the bottom flight of belt 61 adjacent the driven pulley 60 by a U-shaped angle 63 having a base 64 and legs 65 and 66. Angle 63 is rotatably mounted about housing 23 by a journal 67 held in position by retaining rings R and attached to the base 64 of angle 63. The idler pulley 62 is rotatably carried by leg 66 and a torsion spring 68 resiliently connects leg 65 with collar 25 so that angle 63 is constantly urged upwardly to force pulley 62 against belt 61 to maintain substantially constant tension therein without regard to the position of cutting assembly C.

The positioning assembly P further includes an adjusting mechanism M for determining the rotational position of the positioning assembly P about the first axis V. The mechanism M includes and adjustment rod 41 rotatably mounted adjacent guide handle 12 by a guide 42 carried by handle 12 and an ear 43 carried by bracket 20. The upper end of rod 41 includes a crank element 44 for effecting rotation thereof and the lower end of rod 41 includes a threaded portion 45 threaded into a cylindrical nut 46 which is rotatably supported in a sleeve 47 fixed to collar 25. The axial displacement of rod 41 is prevented by means of a collar 48 fixed to rod 41 adjacent ear 43. Rotation of rod 41 in one direction will cause the threaded portion 45 to be threaded into nut 46 thereby decreasing the distance between ear 43 and nut 46 which will in turn cause collar 25 to rotate counterclockwise about axis V (FIG. 6) to effect an upward vertical adjustment of cutting blade 50. Rotation of rod 41 in an opposite direction will effect a downward vertical adjustment of blade 50. It should be pointed out that such an adjustment provides an infinite number of settings for the blade 50 which can be easily achieved even while the edger is in operation.

The relationship of collar 25, L-shaped bracket 26 and U-shaped support frame 29 is detailed such that a vertical adjustment of the cutting blade 50 about axis V will effect a corresponding displacement of the blade drive means about axis V (FIG. 6) to insure a correct alignment and a constant tension of the belt and pulley drive train 55, 60 etc. at all of the vertically adjustable positions.

As seen in FIG. 4, the idler pulley support bracket 63 is fixed to collar 67 journaled on sleeve 23 with the torsion spring 68 mounted on collar 25. Rotation of collar 25 about sleeve 23 will effect a corresponding movement of spring 68 to insure a constant belt tension in all the adjusted positions.

The improvement in the lawn edging and trimming apparatus drive mechanism consists of transfer shaft 56 connnected to engine drive shaft 14 and supported in such a manner as to be coaxial with both the axes of engine drive shaft 14 and the adjustment axis V of bracket 26 and collar 25. Drive pulley 60 is fixed to shaft 56 at a point to be coplanar with the axis of pivot bolt 36. The improved drive further includes driven shaft 52 supported on carriage 29 in spaced parallel relationship with transfer shaft 56 and in such a manner as to be coplanar and perpendicular to the axis of pivot bolt 36 referenced as AX whereby the axis of driven shaft 52 intersects the axis of pivot bolt 36. Driven pulley 56 is fixed to driven shaft 52 at the point of intersection of the axis of shaft 52 the axis of pivot bolt 36, with drive belt 61 mounted on pulleys 56 and 60.

It will be obvious that adjustment of the cutting blade 50 from a vertical cutting plane (FIG. 1), to a horizontal cutting plane or any intermediate angular position is accomplished by removing adjustment bolt 37, rotating carriage 29 about pivot bolt 36 to the desired position and again inserting adjustment bolt 37. Further, vertical adjustment of cutting blade 50 relative to base frame 10 is accomplished by rotating crank 44 in the correct direction to effect the desired vertical adjustment, as outlined in detail herein above. Moreover, the undercarriage 28 and carriage 29 displace the cutting blade 50 laterally outboard of the frame 10 sufficiently to reach over and behind objects such as curbs to cut the grass therebehind or reach below the frame 10 to cut the edge of sand traps on golf courses and the like.

While the particular apparatus outlined herein above in detail is fully capable of attaining the objects and providing the advantages herein before stated, it is to be understood that it is merely illustrative of one embodiment of the invention and that no limitations are intended to the details of construction or design herein shown other than as defined in the appended claims.

I claim:

1. A lawn edging and trimming apparatus including:
   a drive element rotatable about a first axis;
   drive means connected to said drive element for rotating same about said first axis;
   a driven element rotatable about a second axis spaced from said first axis and parallel thereto;
   support means rotatably carrying said driven element, said support means rotatable about said first axis to move said second axis, and said support means constructed and arranged to rotate said second axis about a third axis intersecting said first and second axes and extending through the center of said drive and driven elements;
   flexible drive means connecting said drive element with said driven element to rotate said driven element as said drive element is rotated; and,
   a cutting blade connected to said driven element for rotation about said second axis as said driven element is rotated.

2. The apparatus of claim 1 further including lateral displacement means connecting said support means with said cutting blade for displacing said cutting blade laterally of said support means sufficiently to position said cutting blade over and behind an elevated object lying between said support means and said cutting blade to cut behind said object.

3. A lawn edging and trimming apparatus including a wheel supported base frame having an engine mounted thereon with an extending engine drive shaft; the improvement comprising in combination:
   a. a first support means mounted on said base frame and including a laterally extending drive shaft;

b. means connecting said laterally extending drive shaft to said engine drive shaft;

c. a second support means mounted on said first support means for rotational adjustment about an axis coplanar with and perpendicular to said laterally extending drive shaft;

d. a drive element fixed to said laterally extending drive shaft in coplanar relationship with said second support means rotational adjustment axis;

e. a driven shaft rotatably supported on said second support means in spaced parallel relationship to said laterally extending drive shaft with the axis of said driven shaft perpendicular to and coplanar with said second support means rotational adjustment axis to thereby intersect said rotational axis;

f. a driven element fixed to said driven shaft at said point of intersection;

g. means operatively associated with said drive and driven elements for driving said driven element from said drive element;

h. a cutting blade fixed to said driven shaft for rotation therewith; and i. means operatively associated with said first and second support means for effecting adjustment of said second support means about said rotational adjustment axis.

4. In a lawn edging and trimming apparatus as described in claim 3, in which said first support means is mounted for rotational adjustment relative to said base frame about an axis coaxial with said laterally extending drive shaft, and means operatively associated with said first support means and said base frame for effecting rotational adjustment of said first support means about said first rotational adjustment axis, and said first support means extending sufficiently outward of said base frame to position said cutting blade laterally of said base frame to reach over elevated objects.

5. In a lawn edging and trimming apparatus as described in claim 4, in which said engine drive shaft and said laterally extending drive shaft are coaxially mounted relative to each other.

6. In a lawn edging and trimming apparatus as described in claim 5, in which said drive and driving elements are pulleys and said means operatively associated with said drive and driving elements is a drive belt mounted on said pulleys.

7. In a lawn edging and trimming apparatus as described in claim 6, which includes an idler pulley, means rotatably mounting and adjustably supporting said idler pulley for adjustment about an axis coaxial with said laterally extending drive shaft, and including spring means operatively connected between said first support means and said idler pulley mounting means for effecting automatic adjustment of said idler pulley to insure constant tension on said drive belt 8. In a lawn edging and trimming apparatus as described in claim 7 in which said first support means, said idler pulley mounting means and said spring means are all concentrically supported relative to said laterally extending drive shaft.

9. In a lawn edging and trimming apparatus including a wheel supported base frame having an engine mounted thereon with a laterally extending engine drive shaft, the improvement comprising in combination:

a. a first support means;

b. means mounting said first support means on said base frame for rotational adjustment about an axis coaxial with said laterally extending engine drive shaft;

c. a second support mean;

d. means mounting said second support means on said first support means for rotational adjustment about an axis coplanar with and perpendicular to said engine drive shaft;

e. a second drive shaft connected to and coaxially supported relative to said engine drive shaft with said second drive shaft extending through said first support means;

f. a drive pulley fixed to said second drive shaft in coplanar relationship with said second support means rotational adjustment axis;

g. a driven shaft rotatably supported on said second support means in spaced parallel relationship with said second drive shaft with the axis of said driven shaft perpendicular to and coplanar with said second support means rotational adjustment axis to thereby intersect said rotational axis;

h. a driven pulley fixed to said driven shaft at said point of intersection;

i. a drive belt mounted on said drive and driven pulleys for driving said driven shaft from said drive shaft;

j. a cutting blade fixed to said driven shaft for rotation therewith;

k. means operatively associated with said first and second support means for effecting adjustment of said second support means about said second support means rotational adjustment axis; and, l. means operatively associated with said first support means and said base frame for effecting adjustment of said first support means about said first support means rotational adjustment axis.